(12) United States Patent
Harris

(10) Patent No.: US 9,076,230 B1
(45) Date of Patent: Jul. 7, 2015

(54) CIRCUITRY AND TECHNIQUES FOR IMAGE PROCESSING

(71) Applicant: Altera Corporation, San Jose, CA (US)

(72) Inventor: Jon Michael Harris, North Stoke (GB)

(73) Assignee: Altera Corporation, San Jose, CA (US)

( * ) Notice: Subject to any disclaimer, the term of this patent is extended or adjusted under 35 U.S.C. 154(b) by 105 days.

(21) Appl. No.: 13/890,967

(22) Filed: May 9, 2013

(51) Int. Cl.
*G06K 9/32* (2006.01)
*G03B 13/00* (2006.01)
*H04N 5/232* (2006.01)
*G06T 3/40* (2006.01)
*H04N 7/01* (2006.01)
*G06T 7/00* (2006.01)
*G06T 5/00* (2006.01)

(52) U.S. Cl.
CPC .............. *G06T 3/4007* (2013.01); *G06T 5/001* (2013.01); *G06T 3/403* (2013.01); *G06T 3/40* (2013.01); *H04N 7/012* (2013.01); *H04N 7/0142* (2013.01); *G06T 7/0085* (2013.01)

(58) Field of Classification Search
CPC ......... G06T 3/4007; G06T 3/403; G06T 3/40; G06T 3/4023; G06T 5/001; G06T 7/0085; H04N 7/012; H04N 7/0142
USPC ............. 382/298, 300; 348/448; 358/1.2, 525
See application file for complete search history.

(56) References Cited

U.S. PATENT DOCUMENTS

| | | | |
|---|---|---|---|
| 5,467,138 A | 11/1995 | Gove | |
| 6,980,254 B1 * | 12/2005 | Nishihashi et al. | 348/452 |
| 7,268,822 B2 * | 9/2007 | Kang et al. | 348/448 |
| 7,403,234 B2 * | 7/2008 | Lertrattanapanich et al. | 348/448 |
| 7,907,209 B2 * | 3/2011 | Au et al. | 348/448 |
| 7,944,503 B1 * | 5/2011 | Zhai et al. | 348/452 |
| 7,945,121 B2 * | 5/2011 | Wei et al. | 382/300 |
| 7,982,799 B2 * | 7/2011 | Niedermeier | 348/448 |
| 8,018,530 B2 | 9/2011 | Lu | |
| 8,274,603 B2 | 9/2012 | Dai et al. | |
| 8,306,365 B1 | 11/2012 | Sahu | |
| 8,384,790 B2 | 2/2013 | Knapp | |
| 2006/0176394 A1 | 8/2006 | Fazzini | |

* cited by examiner

*Primary Examiner* — Kanjibhai Patel

(57) ABSTRACT

A method for interpolating an image field with image processing circuitry includes identifying, from a first row in the image field, a pixel to be interpolated. Edge direction vectors from the identified pixel and a plurality of neighboring pixels in a second row of the image field are determined. The edge direction vectors may then be combined to produce an interpolated pixel. The edge direction vectors may be combined such that the pixel is interpolated along each edge direction vector to obtain multiple interpolated pixel values. The pixel may be interpolated based on a weighted average of the interpolated pixel values.

19 Claims, 6 Drawing Sheets

CIRCUITRY AND TECHNIQUES FOR IMAGE PROCESSING

BACKGROUND

Integrated circuits generally include multiple logic blocks that may be used to implement a wide variety of functions including, among others, image processing algorithms. This allows them to be used in video processing applications that are typically required in video surveillance and other imaging systems.

Integrated circuit devices, when used in such systems, typically include circuitry and logic blocks that are configured as image processing tools (e.g., edge detection tool, corner detection, etc.). Edge detection, as its name suggests, is a method of identifying and determining edges in an image (i.e., discontinuities and changes in an image). Generally, edges in images are areas with strong contrast levels (e.g., a significant difference in contrast values from one pixel to an immediately adjacent pixel). Accordingly, edge detection algorithms may be used as a filter to identify important information (e.g., an outline of an object) in an image.

Various well-known edge detector operators such as the Sobel, Canny, and Harris operators may be used to obtain edge direction information in progressive video frames (video frames where all the lines in each frame are scanned or drawn sequentially). The various edge detector operators may also be adapted to detect edges in interlaced video fields. As is generally known, an interlaced video or image contains two fields of lines (i.e., a field displaying the odd lines and another field displaying the even lines of the video frame).

When an interlaced video frame is displayed on a progressive scan monitor, it needs to be converted to a non-interlaced video format. However, depending on the edge detector operator used and how the interpolation is performed, the deinterlaced video (the resulting interpolated image) may contain noticeable artifacts.

SUMMARY

An improved edge interpolation technique allows interlaced video streams to be deinterlaced with reduced artifacts. Embodiments of the present invention include methods and circuitry for performing interpolation on an image field.

It is appreciated that the present invention can be implemented in numerous ways, such as a process, an apparatus, a system, a device, or a computer-readable medium. Several inventive embodiments of the present invention are described below.

A method of interpolating an image field with image processing circuitry may include identifying a pixel to be interpolated in the image field. The identified pixel may be a missing pixel in a row of pixels in the image field. The method may further include determining multiple edge direction vectors based on the identified pixel and neighboring pixels in another row of pixels in the image field. The image processing circuitry may then combine the edge direction vectors to interpolate the identified missing pixel.

A method of processing an image with image processing circuitry may include identifying a pixel to be interpolated. The image being processed may be an image field that includes pixels arranged in rows and the identified pixel may be identified from an intermediate row having two adjacent rows of pixels. A set of pixels in the two adjacent rows of pixels may be identified and an edge direction vector for each pixel in the set of pixels may subsequently be determined. The image processing circuitry may combine the edge direction vectors to produce an interpolated pixel. In one instance, each edge direction vector for each pixel in the set of pixels may include a magnitude value. The pixel may be interpolated along each edge direction vector to obtain a corresponding interpolated pixel value based on the magnitude value of that particular edge direction vector. Accordingly, the interpolated pixel may be produced based on the corresponding interpolated pixel value (e.g., by obtaining a weighted average of the interpolated pixel values).

Image processing circuitry may include pipe circuitry that receives an image field. The image field may include multiple pixels arranged in rows. The image processing circuitry may subsequently identify a pixel for interpolation in the image field. The image processing circuitry may further include edge detection circuitry that identifies a set of pixels in rows of pixels that are adjacent to the identified pixel. The edge detection circuitry may then identify the edge direction vector for each pixel in the set of pixels.

As an example, the edge direction vector may include edge direction information and the magnitude value of a particular pixel. Arithmetic circuitry and divider circuitry may also be included in the image processing circuitry. The included arithmetic circuitry may generate a weighted pixel value from the magnitude value of the edge direction vector for each pixel in the set of pixels and the divider circuitry may generate a weighted mean pixel value for a resultant interpolated pixel based on the weighted pixel value of each of the pixels in the set of pixels.

DETAILED DESCRIPTION

The embodiments provided herein include circuitry and techniques for performing pixel interpolation on an image field.

It will be obvious, however, to one skilled in the art, that the present exemplary embodiments may be practiced without some or all of these specific details. In other instances, well-known operations have not been described in detail in order not to unnecessarily obscure the present embodiments.

Figure 1:
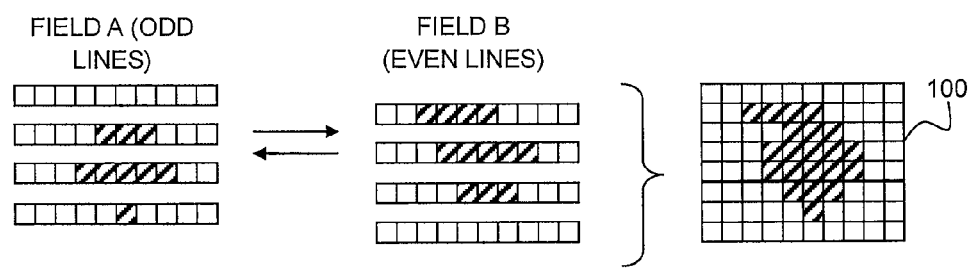
FIG. 1 shows two illustrative interlaced video fields of a video frame and the video frame as combined from the interlaced video fields in accordance with one embodiment of the present invention.

Integrated circuit devices such as field programmable gate array (FPGA) and application specific integrated circuit (ASIC) devices may be used to implement a wide variety functions. As an example, a programmable logic device included in an image processing system may be programmed (i.e., configured) to receive interlaced video fields and may output deinterlaced video frames. FIG. 1 shows illustrative interlaced video fields A and B of video frame 100 in accordance with one embodiment of the present invention. As shown in FIG. 1, video field A may include all the odd lines in video frame 100 while video field B may include all the even lines in video frame 100. When combined, both video fields A and B may produce a video or an image frame similar to video frame 100. Accordingly, it should be appreciated that a video field of an interlaced video frame essentially shows half the video frame (i.e., either all the odd lines or even lines) at any one time.

Generally, an interlaced video frame needs to be converted to a non-interlaced form (i.e., a deinterlaced frame) when it is displayed with a digital device. One of the more common methods of deinterlacing (as the conversion of an interlaced video frame to a non-interlaced frame is commonly known) includes combining or weaving two interlaced fields (e.g., video fields A and B) to form a single frame (e.g., video frame 100). This relatively straightforward method of conversion generally works well for still images (i.e., when there is no movement). However, simply combining two fields may not produce acceptable results when there is movement from one field to another. The differences between the two fields due to motion in a scene may cause the odd and even lines in the resulting video frame to be slightly displaced from each other, oftentimes causing undesirable visual artifacts.

Figure 2:
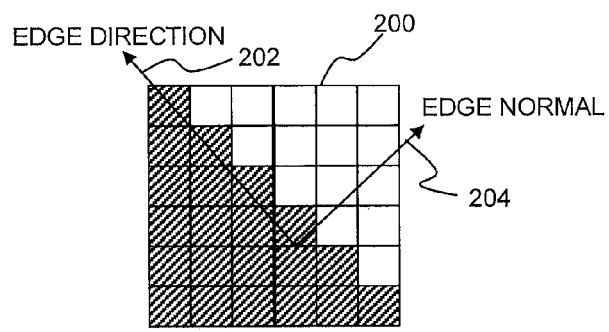
FIG. 2 shows the illustrative edge direction and edge normal of a portion of an image frame.

Accordingly, to obtain better results, missing pixels in a video field (e.g., either video field A or B) may be interpolated using information from existing pixels in the same field. In some instances, improved results may be obtained by performing interpolation in a suitable direction by accurately detecting the direction of edges in an image frame. FIG. 2 shows illustrative edge direction 202 and edge normal 204 of a portion of an image frame 200. As mentioned above, edges in an image may be defined as areas with significant changes of intensity or contrast in the image, which typically occur on the boundary between two different regions in the image. The edge normal refers to the unit vector in the direction of maximum intensity change between two adjacent pixels (e.g., when the difference in the luminance values of the two pixels is above a certain threshold value). Accordingly, the edge direction is the unit vector perpendicular to the edge normal.

Edge direction information may be obtained in progressive video frames (where every line in a frame is drawn or scanned in sequence) by using common operators such as Sobel, Canny, and Harris. One of the embodiments described herein includes an improved technique for interpolating pixels in interlaced video fields with an edge detection operator such as the Sobel, Canny or Harris operator. It should be appreciated that well-known functions of these operators are not described in detail in order to not unnecessarily obscure the present invention.

Figure 3:
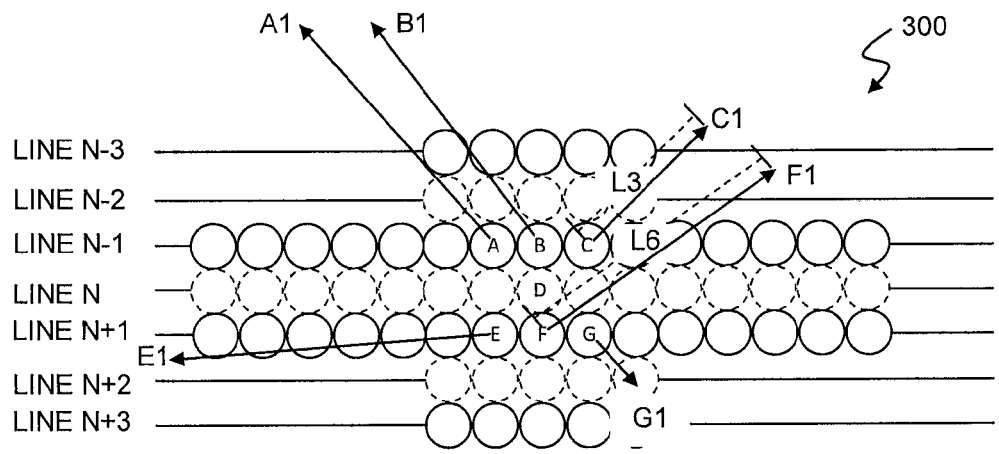
FIG. 3 is an illustrative interlaced image field with alternate rows of pixels in accordance with one embodiment of the present invention.

FIG. 3 is an illustrative interlaced image field 300 with alternate rows of pixels in accordance with one embodiment of the present invention. As an example, image field 300 may show the odd rows of pixels in the field, namely, LINE N−3, LINE N−1, LINE N+1 and LINE N+3 (e.g., in the scenario that N is an even index). Accordingly, missing pixels in the even rows of pixels in image field 300, LINE N−2, LINE N, and LINE N+2, are represented by dashed circles. To obtain a full image frame from an interlaced image field 300, interpolation may need to be performed to fill in the missing pixels in each missing row of pixels.

In the example of FIG. 3, D (shown on LINE N) is the pixel to be interpolated while A, B, C, E, F and G are pixels in rows adjacent to D. Pixels A, B and C are on LINE N−1 and pixels E, F and G are on LINE N+1. As described above, improved interpolation results may be obtained by interpolating the pixel in the correct direction based on the direction of edges in the image frame. The embodiment of FIG. 3 shows the edge direction vectors A1, B1, C1, E1, F1 and G1 that have been calculated for the respective neighboring pixels A, B, C, E, F and G (e.g., calculated from the respective neighboring pixel using edge detection functions such as the Sobel operator).

It should be appreciated that each edge direction vector may include a phase and a magnitude value. In the example of FIG. 3, the different lengths of arrows A1, B1, C1, E1, F1 and G1 may represent the different magnitudes for the respective edge direction vectors. It should be noted that an arrow with a longer length may represent a larger magnitude value compared to an arrow with a shorter length. As an example, arrow F1 with length L6 is longer than arrow C1 with length L3. As such, edge direction F1 may have a greater magnitude compared to edge direction C1. In one embodiment, interpolations may be performed based on every edge direction vector of the set of pixels surrounding the pixel to be interpolated before a weighted average is calculated according to the respective vector magnitudes.

Figure 4A:
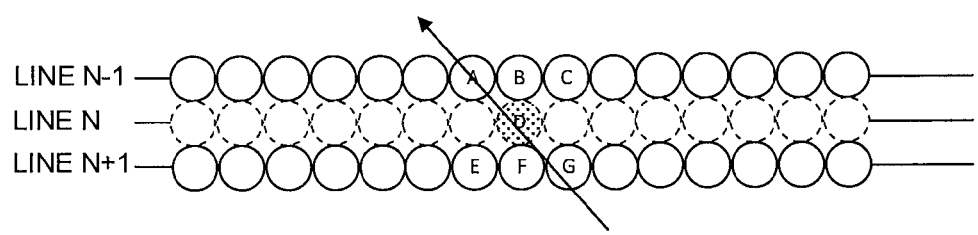
FIGS. 4A-4C show results of interpolations performed along the direction of various edge direction vectors in accordance with one embodiment of the present invention.
Figure 4B:
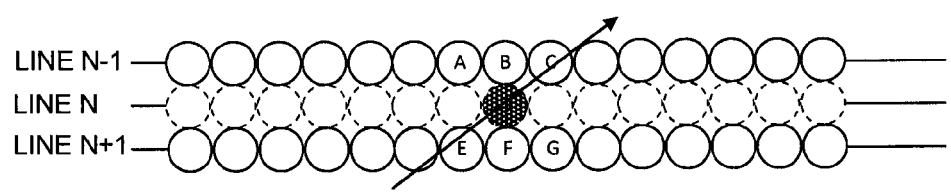
Figure 4C:
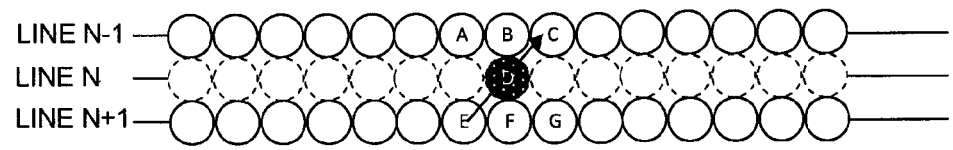

FIGS. 4A-4C show results of interpolations performed along the direction of various edge direction vectors in accordance with one embodiment of the present invention. It should be appreciated that FIGS. 4A-4C are simplified versions of image field 300 shown in FIG. 3 and as such, for the sake of brevity, some of the details that have been described above will not be repeated. FIGS. 4A-4C show the pixel to be interpolated (the identified pixel), D, on LINE N and a set of pixels in rows adjacent to it, namely, pixels A, B and C on LINE N−1; and E, F and G on LINE N+1. FIG. 4A depicts the interpolation of the identified pixel, D, along the edge direction vector of pixel A. FIG. 4B shows the pixel, D, on LINE N being interpolated along the edge direction vector of another pixel C; and FIG. 4C shows the pixel, D, being interpolated along the edge direction vector of yet another pixel in the set of pixels.

Depending on the edge direction vector used in the interpolation, the pixel being interpolated may have different pixel values (e.g., the hue and luminance of the interpolated pixel may change). In the embodiments of FIGS. 4A-4C, the different pixel values may be depicted by the different shades of pixel D. It should be appreciated that the selected pixel, in this case, D, may be interpolated along the edge direction vector of at least two and potentially each pixel on the lines or rows of pixels directly adjacent to it, and for the sake of brevity, further interpolations of pixel D are not shown. A weighted average of the resultant interpolated pixel values may be calculated using the respective magnitudes of the original edge direction vectors. The equation below may be used to calculate the weighted average of a resultant interpolated pixel:

$$\frac{\sum_{i=1}^{n} m_i p_i}{\sum_{i=1}^{n} m_i}$$

In the equation above, m may represent the magnitude of the edge direction vector, n may represent the number of pixels in the set of pixels used for interpolation, such as those adjacent to the pixel being interpolated, and p may represent the pixel value of a particular pixel in the set of pixels used to interpolate the selected pixel. The result calculated using the above equation may provide a pixel value for a pixel that is being interpolated based on n number of adjacent pixels.

It should be noted that the equation above may be used for interpolating a pixel in a monochrome image. To interpolate a pixel in a color image, the equation may be extended to cover the chrominance values of that particular pixel:

$$\frac{\sum_{i=1}^{n} m_i Y_i}{\sum_{i=1}^{n} m_i}, \frac{\sum_{i=1}^{n} m_i CB_i}{\sum_{i=1}^{n} m_i}, \frac{\sum_{i=1}^{n} m_i CR_i}{\sum_{i=1}^{n} m_i}$$

The equation above represents the interpolation of a pixel based on its luminance value Y, and the different components of its chrominance values, CB and CR, respectively. The above equation may be used to interpolate pixels in images that use different types of subsampling (e.g., the 4:2:1, 4:2:2, and 4:4:4 subsampling modes). It should be appreciated that specific details of the different types of subsampling available are not described herein in order to not unnecessarily obscure the present invention.

Figure 5:
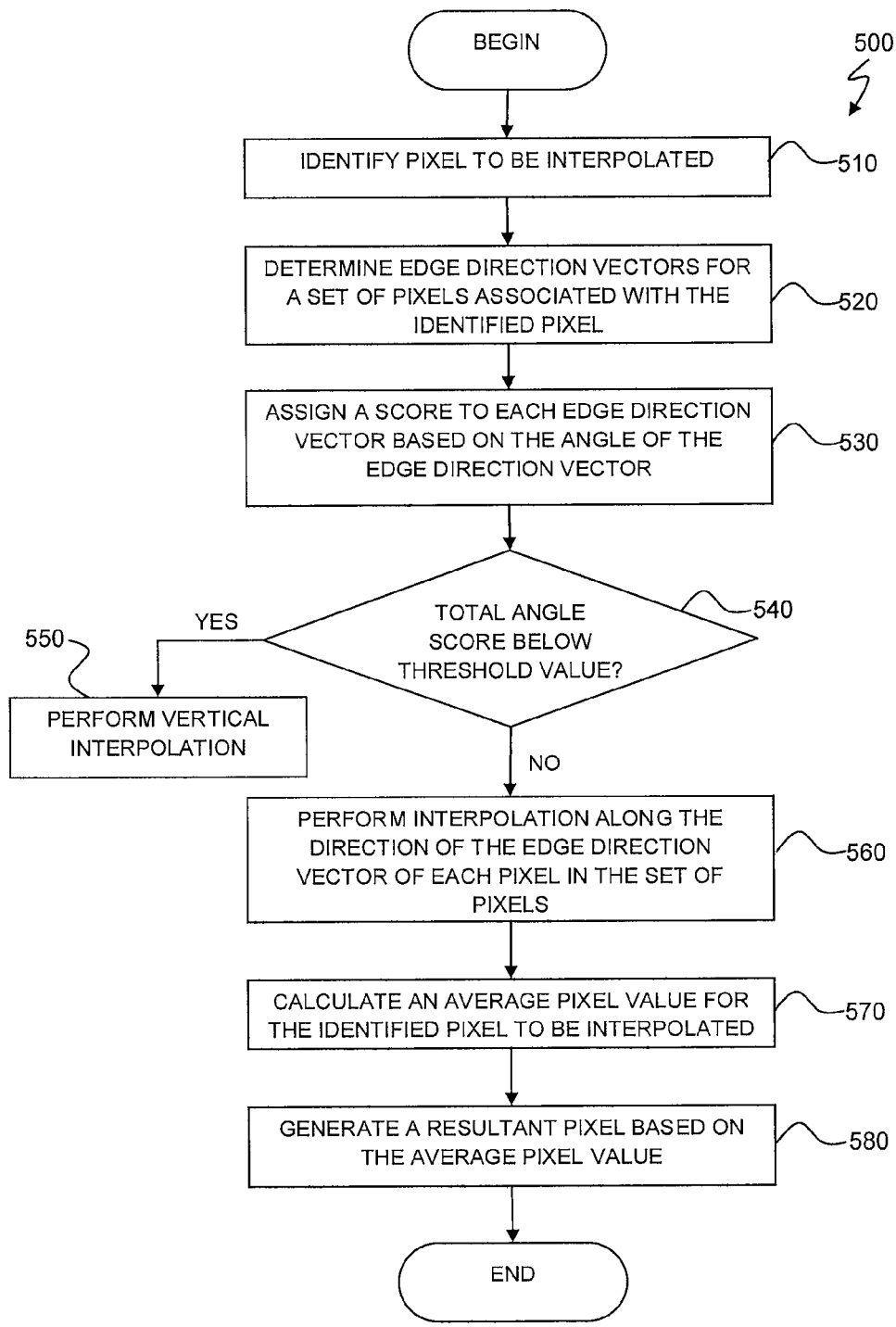
FIG. 5 shows a simplified method for processing an image in accordance with one embodiment of the present invention.

FIG. 5 shows simplified method 500 for processing an image in accordance with one embodiment of the present invention. In one embodiment, method 500 may be performed by image processing circuitry that receives interlaced image fields (e.g., video field A or B of FIG. 1) as input streams. At step 510, a pixel to be interpolated is identified. The identified pixel may be a missing pixel from a missing row in a received interlaced image field. At step 520, the edge direction vectors for a set of pixels associated with the identified pixel (e.g., pixels that are adjacent to the identified pixel) are determined. As an example, if the received video field contains odd rows of pixels, the pixel to be interpolated may be a missing pixel in an even row of missing pixels between two odd rows of pixels and the edge direction vectors for the set of pixels in the upper and lower adjacent rows may be determined at step 520.

At step 530, a score or value is assigned to each edge direction vector of each of the associated pixels based on the angle of that particular edge direction vector with respect to a horizontal axis of the image field. In one embodiment, if the angle of an edge direction vector with respect to its horizontal axis is below a certain threshold angle (e.g., an angle of 10 degrees or below), a lower score may be assigned to that edge direction vector. At step 540, a total angle score may be compared with a threshold value, and if the total angle score is below the threshold value, a vertical interpolation is performed at step 550. In one embodiment, vertical interpolation is performed by using the top and bottom pixels that are directly adjacent to the identified pixel or the pixel to be interpolated (e.g., interpolated vertically based on the average pixel values of the top and bottom pixels).

If the total angle score is above the threshold value, at step 560, interpolation is performed along the edge direction vector of each of the pixels associated with the identified pixel. A specific pixel value may thus be obtained based on the interpolation along each edge direction vector. At step 570, an average pixel value for the pixel to be interpolated is calculated. In one embodiment, the average pixel value may be a weighted average that is calculated using the magnitude of each of the edge direction vectors of the set of pixels adjacent to the identified pixel. At step 580, a resultant pixel is generated based on the average pixel value calculated at step 570. In one embodiment, method 500 may be part of a deinterlacing technique to produce a complete video frame from an interlaced video field (e.g., video field A or B of FIG. 1).

Figure 6:
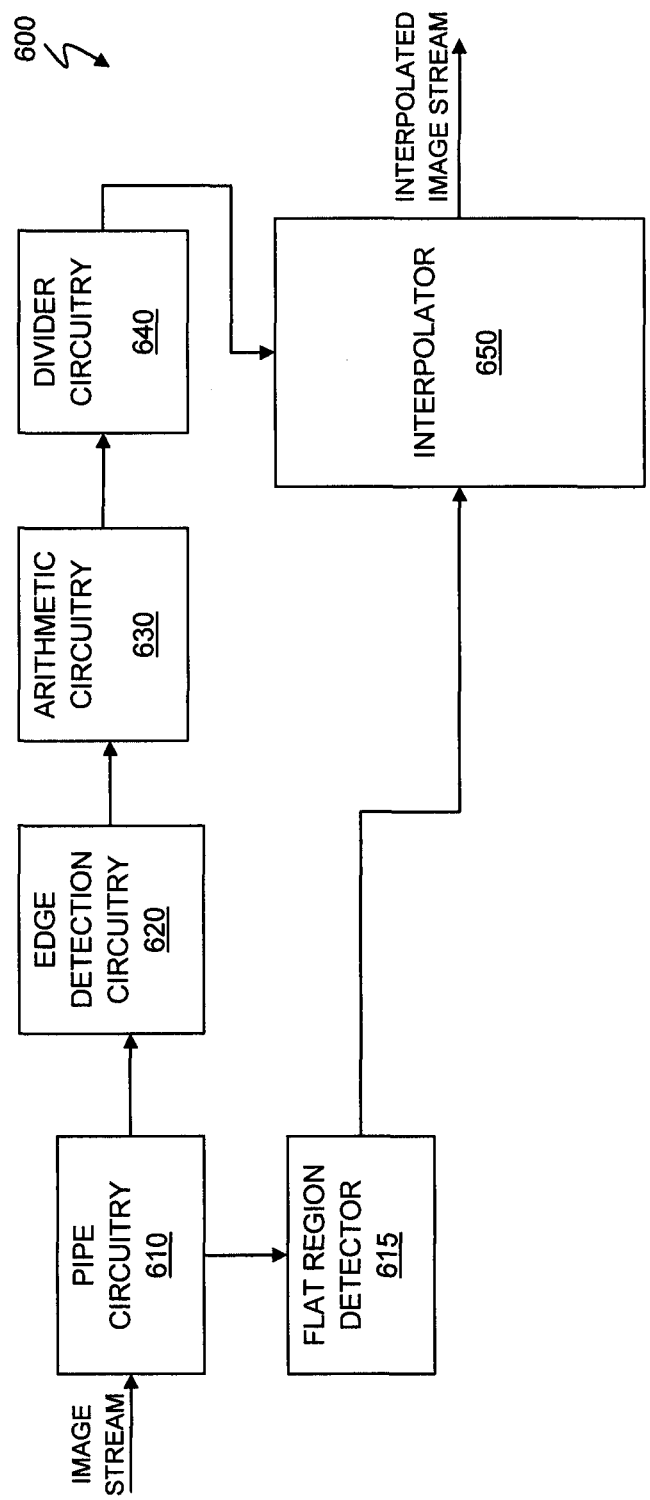
FIG. 6 is a simplified block diagram of image processing circuitry in accordance with one embodiment of the present invention.

FIG. 6 is a simplified block diagram of image processing circuitry 600 in accordance with one embodiment of the present invention. Image processing circuitry 600 may include pipe circuitry 610, edge detection circuitry 620, arithmetic circuitry 630, divider circuitry 640, flat region detector 615, and interpolator 650. As an example, image processing circuitry 600 may be part of an integrated circuit device that receives an image stream for processing. In one embodiment, the image stream may include interlaced video fields and image processing circuitry 600 may be a deinterlacing circuit, such as a bob deinterlacer, that is used to process the received image stream.

As is generally known, the bob deinterlacer may deinterlace an image by using a scanline duplication technique or by performing scanline interpolation. With scanline duplication, output frames may be produced by simply repeating every line in the current field twice. Compared to scanline duplication, scanline interpolation is a more sophisticated technique where output frames are produced by filling in the missing lines from the current field by interpolating the missing pixels based on the lines above and below them. Accordingly, in one embodiment, image processing circuitry 600 may be part of a motion-adaptive video deinterlacer with edge interpolation.

As shown in FIG. 6, the image stream is received at pipe circuitry 610. Pipe circuitry 610 may generate a pixel from the image stream at every clock cycle. Pixel information, such as that from neighboring pixels of the pixel to be interpolated, may be read and placed in the pipeline before their respective weighted average values are calculated. Edge dependent interpolation may be performed by edge detection circuitry 620. In one embodiment, edge detection circuitry 620 may implement an edge detection operator (e.g., the Sobel operator) for pixel interpolation. It should be appreciated that interpolation may be performed based on a set of adjacent pixels to obtain different interpolated pixel values. For example, interpolation may be performed along an edge direction vector of each adjacent pixel. Arithmetic circuitry 630 may be coupled to receive the interpolated pixel values from edge detection circuitry 620 and may generate the sum of all the interpolated pixel values.

The total sum generated may be the sum of all the weighted pixel values, where the pixel values are weighted based on magnitudes of the respective edge direction vectors, and divider circuitry 640 may produce a weighted mean value of the interpolated pixels to obtain the pixel value of the resultant output pixel. In one embodiment, arithmetic circuitry 630 may include scaling circuitry that can scale the magnitude values of the respective edge direction vectors to produce scaled interpolated pixel values. The scaling factor may be determined by the largest magnitude value (e.g., the magnitude values of each edge direction vector may be scaled by the largest magnitude value among the edge direction vectors). It should be appreciated that different scaling techniques may be used and as such, specific details of such techniques are not described in order to not unnecessarily obscure the present invention.

In the embodiment of FIG. 6, flat region detector 615 is coupled to pipe circuitry 610. Flat region detector 615 may be used to detect if the pixel to be interpolated lies in a flat region. If it does, a vertical interpolation may be performed by interpolator 650. It should be appreciated that a flat region in an image may refer to a region where pixel values are relatively similar with each other (e.g., an area with a uniform color).

As described in the embodiment of FIG. 5, scores may be assigned to pixels that are adjacent to the pixel to be interpolated based on angles of their respective edge direction vectors. If the total angle score is below a predefined threshold value, a vertical interpolation may be performed at step 550 as shown in FIG. 5. In one embodiment, a vertical interpolation may refer to a technique where the missing pixel is generated using the average values of the pixels directly above and below it. Therefore, interpolator 650 may perform either a vertical interpolation or an edge dependent interpolation, depending on inputs received from flat region detector 615 and divider circuitry 640, on each missing pixel in the received image stream. Accordingly, the received image stream may thus be processed by image processing circuitry 600 to generate an interpolated image stream as an output.

Figure 7:
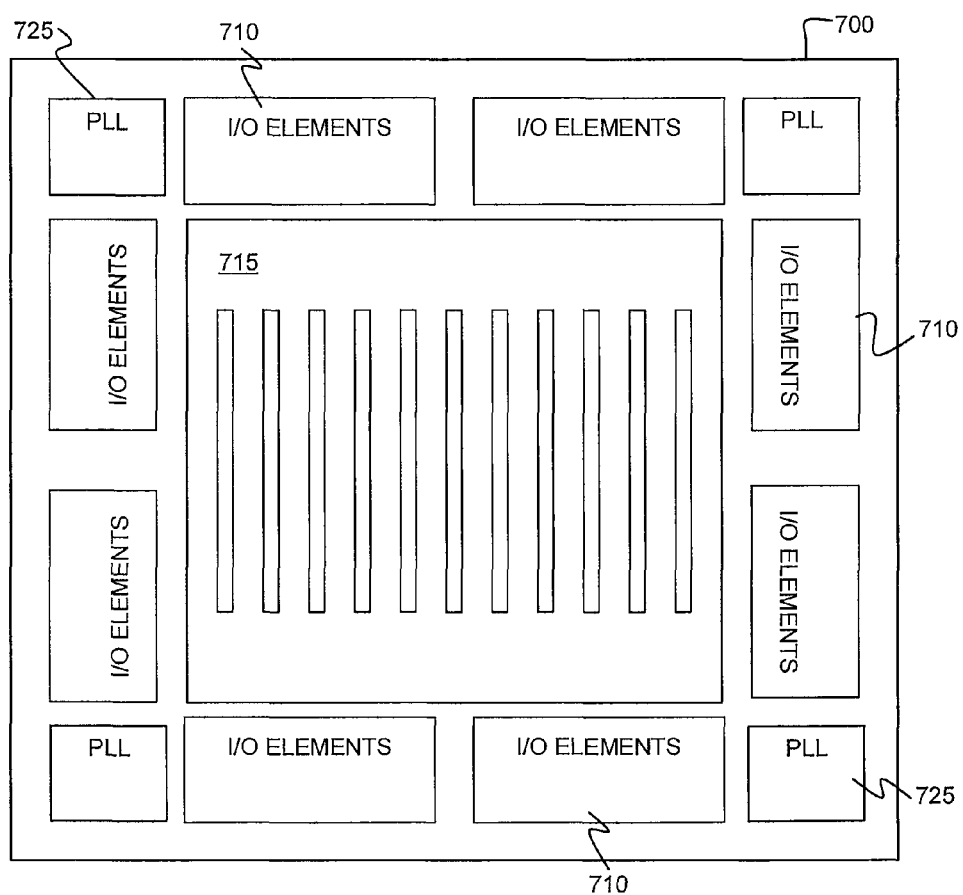
FIG. 7 shows a simplified block diagram of an integrated circuit that can implement embodiments of the present invention.

FIG. 7, meant to be illustrative and not limiting, shows a simplified block diagram of integrated circuit 700 that may be used to implement embodiments of the present invention. Integrated circuit 700 includes core logic region 715 and input-output elements 710. Other auxiliary circuits, such as phase-locked loops (PLLs) 725 for clock generation and timing, can be located outside the core logic region 715 (e.g., at corners of integrated circuit 700 and adjacent to input-output elements 710).

In the embodiment of FIG. 7, input-output elements 710 may include input-output buffers that connect integrated circuit 700 to other external components. Accordingly, integrated circuit 700 may receive signals from external circuitry at input-output elements 710 and the signals may be routed from input-output elements 710 to core logic region 715 and other logic blocks on integrated circuit 700. Core logic region 715 and other logic blocks on integrated circuit 700 may perform functions based on the signals received. Accordingly, signals from core region 715 may be transmitted through input-output elements 710 to external components that may be connected to integrated circuit 700.

A single device like integrated circuit 700 can potentially support a variety of different interfaces and each individual input-output bank 710 can support a different input-output standard with a different interface. Integrated circuit 700 may be a programmable integrated circuit that includes core logic region 715 with logic cells that may include "logic elements" (LEs), among other circuits. LEs may include look-up table-based logic regions and may be grouped into "Logic Array Blocks" (LABs). The LEs and groups of LEs or LABs can be configured to perform logical functions desired by the user. Configuration data loaded into configuration memory can be used to produce control signals that configure the LEs and groups of LEs and LABs to perform the desired logical functions. In one embodiment, an integrated circuit device (e.g., integrated circuit 700) may be configured to include circuitry for image processing, similar to image processing circuitry 600 of FIG. 6.

The embodiments, thus far, were described with respect to programmable logic circuits. The method and apparatus described herein may be incorporated into any suitable circuit. For example, the method and apparatus may also be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The foregoing is merely illustrative of the principles of this invention and various modifications can be made by those skilled in the art without departing from the scope and spirit of the invention.

What is claimed is:

1. A method of interpolating an image field with image processing circuitry, the method comprising:

with the image processing circuitry, identifying a pixel to be interpolated from a first row of the image field;

with the image processing circuitry, determining a plurality of edge direction vectors from the identified pixel and a plurality of neighboring pixels in a second row of the image field;

with the image processing circuitry, combining the plurality of edge direction vectors to produce an interpolated pixel; and assigning a score to each pixel of the plurality of neighboring pixels in the second row based on an angle of a corresponding edge direction vector of that pixel with respect to a horizontal axis of the image field.

2. The method defined in claim 1, wherein combining the plurality of edge direction vectors comprises:

with the image processing circuitry, interpolating the pixel to be interpolated along the plurality of edge direction vectors to obtain a plurality of interpolated pixel values; and with the image processing circuitry, producing the interpolated pixel from the plurality of interpolated pixel values.

3. The method defined in claim 2, wherein each pixel value of the plurality of interpolated pixel values comprises a magnitude associated with the respective edge direction vectors.

4. The method defined in claim 3, wherein producing the interpolated pixel comprises:
   calculating a weighted average value based on the magnitudes associated with the respective edge direction vectors, wherein the interpolated pixel value is produced based on the weighted average value.

5. The method defined in claim 4 further comprising:
   scaling the magnitude of each respective edge direction vector prior to the calculating the weighted average value.

6. The method defined in claim 1 further comprising:
   summing the score of each pixel in the plurality of neighboring pixels in the second row to produce a total score;
   comparing the total score with a threshold value; and
   performing a vertical interpolation on the pixel to be interpolated using a top pixel and a bottom pixel directly adjacent to the identified pixel to be interpolated in response to the comparison of the total score with the threshold value.

7. The method defined in claim 1 further comprising:
   determining another plurality of edge direction vectors for at least a portion of another plurality of pixels in a third row, wherein the third row is adjacent to the first row; and
   interpolating the pixel in response to each edge direction vector of the another plurality of edge direction vectors in the third row to obtain another plurality of interpolated pixel values.

8. The method defined in claim 7, wherein the interpolated pixel is produced based on the plurality of interpolated pixel values and the another plurality of interpolated pixel values.

9. A method of processing an image with image processing circuitry wherein the image includes pixels arranged in rows and, the method comprising:
   identifying a pixel to be interpolated from an intermediate row having first and second adjacent rows;
   identifying a set of pixels in the first and second adjacent rows of pixels;
   determining an edge direction vector for each pixel in the set of pixels;
   combining the edge direction vectors to produce an interpolated pixel; and
   assigning a score to each pixel in the set of pixels based on an angle of a corresponding edge direction vector of that pixel with respect to a horizontal axis of the image.

10. The method defined in claim 9 wherein the edge direction vector comprises a magnitude value, wherein combining the edge direction vectors comprises:
    interpolating the identified pixel to be interpolated along the edge direction vector of each pixel to obtain a corresponding interpolated pixel value; and
    producing the interpolated pixel based on the corresponding interpolated pixel value of each pixel in the set of pixels.

11. The method defined in claim 10 further comprising:
    calculating an average output pixel value for the identified pixel based on the magnitude value of the edge direction vector and the corresponding interpolated pixel value of each pixel in the set of pixels.

12. The method defined in claim 9, wherein the image comprises an interlaced video frame with a plurality of odd and even rows of pixels.

13. The method defined in claim 12 further comprising:
    comparing the score of each pixel in the set of pixels to a threshold angle to determine a total number of pixels in the set of pixels that lies below the threshold angle;
    comparing the total number of pixels with a threshold value; and
    performing a vertical interpolation on the identified pixel to be interpolated using a top pixel and a bottom pixel directly adjacent to the identified pixel to be interpolated in response to the comparison of the total number of pixels with the threshold value.

14. Image processing circuitry comprising:
    pipe circuitry that receives an image field, wherein the image field comprises a plurality of pixels arranged in rows, wherein the pipe circuitry identifies a pixel for interpolation from an intermediate row having first and second adjacent rows;
    edge detection circuitry that identifies a set of pixels in the first and second adjacent rows of pixels and an edge direction vector for each pixel in a set of pixels, wherein the edge direction vector includes edge direction information and a magnitude value;
    arithmetic circuitry that generates a weighted pixel value from the magnitude value of the edge direction vector for each pixel in the set of pixels; and
    divider circuitry that generates a weighted mean pixel value for a resultant interpolated pixel based on the weighted pixel value of each pixel in the set of pixels.

15. The image processing circuitry defined in claim 14, wherein the received image field includes a plurality of color channels.

16. The image processing circuitry defined in claim 14 further comprising:
    scaling circuitry that scales the magnitude value prior to generating the weighted pixel value.

17. The image processing circuitry defined in claim 14 further comprising:
    interpolator circuitry that interpolates the identified pixel based on the weighted mean pixel value.

18. The image processing circuitry defined in claim 17 further comprising:
    flat region detection circuitry that assigns a score to each pixel in the set of pixels based on an angle of a corresponding edge direction vector of each pixel in the set of pixels with respect to a horizontal axis of the image field.

19. The image processing circuitry defined in claim 18 wherein the interpolator circuitry performs a vertical interpolation on the identified pixel for interpolation when a total sum of the score of each pixel in the set of pixels is below a threshold value.

* * * * *